Sept. 9, 1947.                J. F. BROVSKY                2,427,192
BLEND OF RUBBERY BUTADIENE-STYRENE COPOLYMER AND CHLOROPRENE POLYMER
Filed Dec. 4, 1943
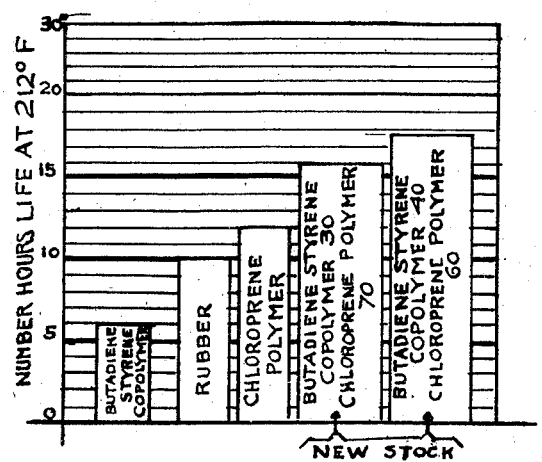
Fig.-1-
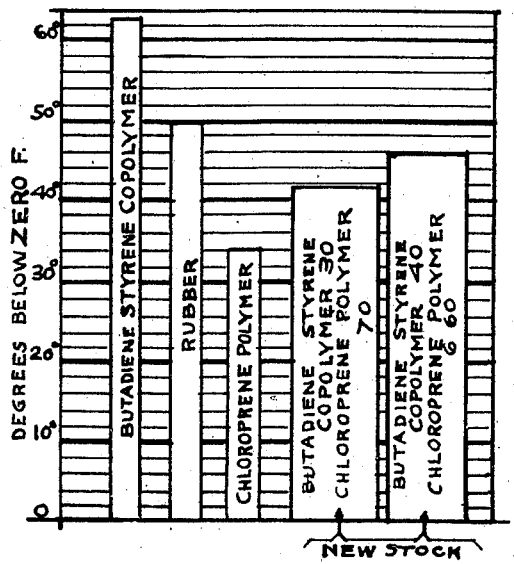
Fig.-2-
INVENTOR.
JOSEPH F. BROVSKY
BY
Martin E Anderson
ATTORNEY Patented Sept. 9, 1947

2,427,192

UNITED STATES PATENT OFFICE 2,427,192

BLEND OF RUBBERY BUTADIENE-STYRENE COPOLYMER AND CHLOROPRENE POLYMER

Joseph F. Brovsky, Denver, Colo., assignor to Gates Rubber Company, Denver, Colo., a corporation of Colorado Application December 4, 1943, Serial No. 512,971

1 Claim. (Cl. 260—45.5)

This invention relates to improvements in compositions of matter and has reference more particularly to improvements in synthetic rubber-like compounds.

Natural rubber is extensively employed in machinery of all kinds and finds a wide application in belts, tires and other rubber products.

Where machines comprising parts of rubber and/or which employ rubber composition belts are used under temperature conditions that are subject to minor variations only, natural rubber serves well, and is extensively used.

With machines operating under conditions of large temperature changes, such as airplanes, tanks and trucks during a global war, where the temperature may vary from minus 40° F. or lower, to temperature as high as 212° F. it has been demonstrated that while natural rubber serves very well at the low temperature, it softens and loses its value at high temperatures.

There are today in common use several rubber-like materials, generally referred to as "synthetic rubber"; the two outstanding of these are (1) chloroprene polymer and (2) butadiene styrene copolymer.

It has been found that both chloroprene polymer and butadiene styrene copolymer properly compounded can be substituted for natural rubber in many articles, as, for example, belts and in automobile, airplane and truck tires, all of which articles are subjected to severe flexing and temperature variations.

Chloroprene polymer is superior to natural rubber where both are subjected to severe flexing at a temperature of 212° F., whereas, butadiene styrene copolymer is inferior to natural rubber when severely flexed at this temperature; this was determined from the following test:

Three V-belts of the same size and construction; one employing a natural rubber composition, one chloroprene polymer and the other butadiene styrene copolymer, were subjected to severe flexing by means of a suitable belt testing apparatus maintained at 212° F. and gave the following results:

|  | Hours |
|---|---|
| Chloroprene polymer belt ran | 12 |
| Natural rubber belt ran | 10 |
| Butadiene styrene copolymer belt ran | 6 |

Chloroprene polymer proved to be the best material for belts operating at high temperature. The above tests were made with material having a type "A" durometer hardness of 70.

It would be natural to suppose that by mixing chloroprene polymer and butadiene styrene copolymer in equal parts the resultant compound would have temperature characteristics that would be the average of the two, but this is not the case.

A belt employing a blend comprising seventy parts of chloroprene polymer and thirty parts, by weight of butadiene styrene copolymer was then subjected to test under the temperature conditions outlined above and ran for sixteen hours, and at low temperature the belt operated successfully down to —42° F. The blended synthetic belt was thus found to be greatly superior to the belts made from chloroprene polymer, natural rubber, or butadiene styrene copolymer alone. In fact the life of the belt of blended material was equal to the total life of both the chloroprene polymer and the butadiene styrene copolymer belts, when operating under 212° F.

Tests with mixtures containing a lower percentage of butadiene styrene copolymer showed that beneficial results were obtained by adding a smaller percentage, the improvement was not very marked until the percentage reached 25 and increased rapidly from this point. The tests showed that for practical purposes the percentage of butadiene styrene copolymer should be at least 30.

A belt consisting of a blend of sixty parts of chloroprene polymer and forty parts of butadiene styrene copolymer was now tested under the same high and low temperature conditions. This belt operated successfully down —46° F. and at 212° F. ran for eighteen hours.

The belt and equipment were subjected to a temperature of —40° F. for a period of twenty-four hours before the test was made so as to allow the parts to attain this temperature. The apparatus was now started. The belts did not break on starting at 45 R. P. M. maximum speed while at this temperature. The lowest temperature at which the belts could be started satisfactorily were as follows:

Chloroprene polymer belt down to —34° F.
The natural rubber belt down to —50° F.
The butadiene styrene copolymer belt down to —63° F.

From this it appears evident that the chloroprene polymer belt which showed up the best under high temperature gave the poorest performance under low temperature, and the butadiene styrene copolymer belt which gave the poorest performance under high temperature conditions, was best for low temperature.

The results of the tests show that when properly compounded chloroprene polymer and butadiene styrene copolymer are mixed, they form an alloy or a new compound that has unexpected properties beyond what would be expected from the average of the two compounds. Whereas, butadiene styrene copolymer lasted the shortest time under the high temperature test it greatly increased the life of the belt under the same temperature conditions when it was mixed with chloroprene polymer in the proportions of 70 parts of chloroprene polymer to 30 parts of butadiene styrene copolymer. The tests furthermore show that by increasing the butadiene styrene copolymer in proportion to the chloroprene polymer from 30 to 40 parts in 100 the life of the belt is further increased. It is to be noted that the low temperature resistance increased more slowly than the high temperature resistance and remained either at −42° F. or lower which is low enough for any practical purpose in a global war in all cases where such belts will be used on land and in the air.

Since the heat resistance can be increased without seriously affecting the low temperature resistance, it is possible to so compound the belt material that it can be suited to wide temperature ranges.

In the accompanying drawing the results obtained by the above tests have been shown graphically.

Figure 1 being a comparison between the life of the several belts when operated under test conditions at a temperature of 212° F.; and Figure 2 is a comparison between the several belts showing the lowest temperature at which they can be operated.

From the drawing it will be seen that butadiene styrene copolymer will stand a lower temperature than either natural rubber or chloroprene polymer, but is the least suited for use under high temperature conditions. Chloroprene polymer is somewhat better than natural rubber. When chloroprene polymer and butadiene styrene copolymer are blended (either compounded and mixed separately, then blended, or blended before compounding) in various proportions a new compound will be formed which has a low temperature resistance that is substantially an average for the proportions employed, but which has a heat resistance far above what might be reasonably expected from their individual characteristics, the heat resistance increasing to above that of either of them separately.

Chloroprene polymer belts under test conditions using high temperature lasted twelve hours, whereas belts made from seventy parts chloroprene polymer and thirty parts butadiene styrene copolymer lasted sixteen hours under the same conditions and belts made from sixty parts of chloroprene polymer and forty parts butadiene styrene copolymer lasted eighteen hours.

As an example of the butadiene styrene copolymer and the chloroprene polymer compounds employed the following is given, the parts are given by weight.

| | By weight |
|---|---|
| Butadiene styrene copolymer | 100 |
| Zinc oxide | 5 |
| Stearic acid | 2 |
| Carbon black | 30 |
| Coal tar plasticizer | 5 |
| Sulphur | 2 |
| Accelerator, N-cyclohexyl benzthiazyl sulphonamide | 1.5 |
| | 145.5 |

The butadiene-styrene copolymer employed comprises 80 parts of styrene, but this ratio may be varied within the accepted range of tolerance.

The several ingredients were mixed for thirty minutes in a mill, preferably open.

| | By weight |
|---|---|
| Chloroprene polymer | 100 |
| Piperidinium pentamethylene dithiocarbamate | 0.1 |
| Magnesium oxide, extra light | 6.98 |
| Zinc oxide | 5. |
| Phenyl-beta-naphthylamine | 1.97 |
| Lamp black | 43.3 |
| Mineral oil | 5.0 |
| Pine tar | 1.97 |
| Stearic acid | 1.04 |
| Accelerator, benzothiazyl disulphide | 1.04 |
| Cottonseed oil | 2.92 |
| | 169.32 | milled about thirty minutes.

The compounds resulting from the above are blended in the desired proportions of butadiene styrene copolymer and chloroprene polymer. If 30 parts by weight of butadiene styrene copolymer is to be mixed with 70 parts of chloroprene polymer it will require 30 hundredths of the butadiene styrene copolymer compound or (145.5÷100×30=43.65) 43.65 pounds.

Seventy pounds of chloroprene polymer will require 70 hundredths of the compound or (169.32÷100×70=118.52) 118.52 pounds of the compound. If any other proportions of butadiene styrene copolymer and chloroprene polymer are desired the weights of the compounds are determined in like manner.

The butadiene styrene copolymer and chloroprene polymer compounds prepared as per the above examples are mixed in a suitable mill until the mixture becomes thorough and intimate, after which the articles are formed from the mixture and then subjected to a curing or vulcanizing treatment. The degree of vulcanization is controlled by the amount of sulphur or other vulcanizing agent and the above compounds are modified in a well known manner so as to get the proper degree of hardening.

From the above it will be evident that chloroprene polymer and butadiene styrene copolymer interact when blended to form a new compound that have characteristics that differ from both and that it behaves somewhat like metals that have the property of forming alloys. By combining the two "synthetic rubbers" in the manner and in the proportions described, we have produced a material or compound having a greater practical working range when cured, for the products in which it is used, and which substantially covers the entire temperature range needed whereas any of the compounds separately failed to do so.

It is not possible to blend all kinds of so-called "synthetic rubbers" and this property is therefore not one that can be reasonably assumed to be present between chloroprene polymer and butadiene styrene copolymer.

Although any amount of butadiene styrene copolymer mixed with chloroprene polymer in the manner above outlined produces some beneficial results, the beneficial results become very marked when the proportion reaches a value of three (3) parts by weight of butadiene styrene copolymer to seven (7) parts by weight of chloroprene polymer and it increases until the proportion reaches the value of four (4) parts of butadiene styrene copolymer to six (6) parts of chloroprene polymer.

This application is a continuation in part of applicant's copending application Serial No. 471,941, filed January 11, 1943.

Having described the invention what is claimed as new is:

A synthetic rubber comprising, a blend of rubbery copolymer of butadiene and styrene, and a curable chloroprene polymer, in the proportion of between 30 to 40 parts by weight of the former to between 70 to 60 parts by weight of the latter.

JOSEPH F. BROVSKY.

REFERENCES CITED

The following references are of record in the file of this patent:

UNITED STATES PATENTS

| Number | Name | Date |
| --- | --- | --- |
| 2,279,450 | Diehl | Apr. 14, 1942 |
| 2,281,375 | Nowak | Apr. 28, 1942 |
| 2,066,331 | Carothers et al. | Jan. 5, 1937 |
| 2,381,267 | Drake | Aug. 7, 1945 |

OTHER REFERENCES

"The Compounding of Buna S" by Lawrence—Report No. 42–4, Dec. 1942, page 6, pub. by Rubber Chem. Div., Du Pont, Wilmington, Del.

Report BL–122, Oct. 15, 1943, pub. by Rubber Chem. Div., Du Pont, Wilmington, Del.